March 13, 1973 C. STETTLER 3,720,353

FLUID METERING PUMP

Filed Jan. 19, 1972

United States Patent Office 3,720,353
Patented Mar. 13, 1973

3,720,353
FLUID METERING PUMP
Christian Stettler, Lotzwil, Switzerland, assignor to Greiner Electronic AG, Langenthal, Switzerland
Filed Jan. 19, 1972, Ser. No. 219,014
Claims priority, application Switzerland, Apr. 22, 1971, 5,873/71
Int. Cl. B67d 5/40
U.S. Cl. 222—380                        9 Claims

ABSTRACT OF THE DISCLOSURE

A fluid metering pump, including a housing containing a fluid storage chamber, a metering chamber and an outlet, reversing valve means operable between filling and dispensing positions for connecting said metering chamber alternately with said storage chamber and with said outlet, respectively, and plunger means operable in one direction to draw fluid from said storage chamber into said metering chamber and in the opposite direction to force fluid from said metering chamber outwardly of said housing via said outlet. In the preferred embodiment, the reversing valve means includes a valve body that is rotatably connected with said housing for displacement between said filling and dispensing positions, said storage and metering chambers being arranged on opposite sides of said valve body and said plunger means being axially slidable in a central through bore contained in, and coincident with the axis of rotation of, said valve body.

Figure 1:
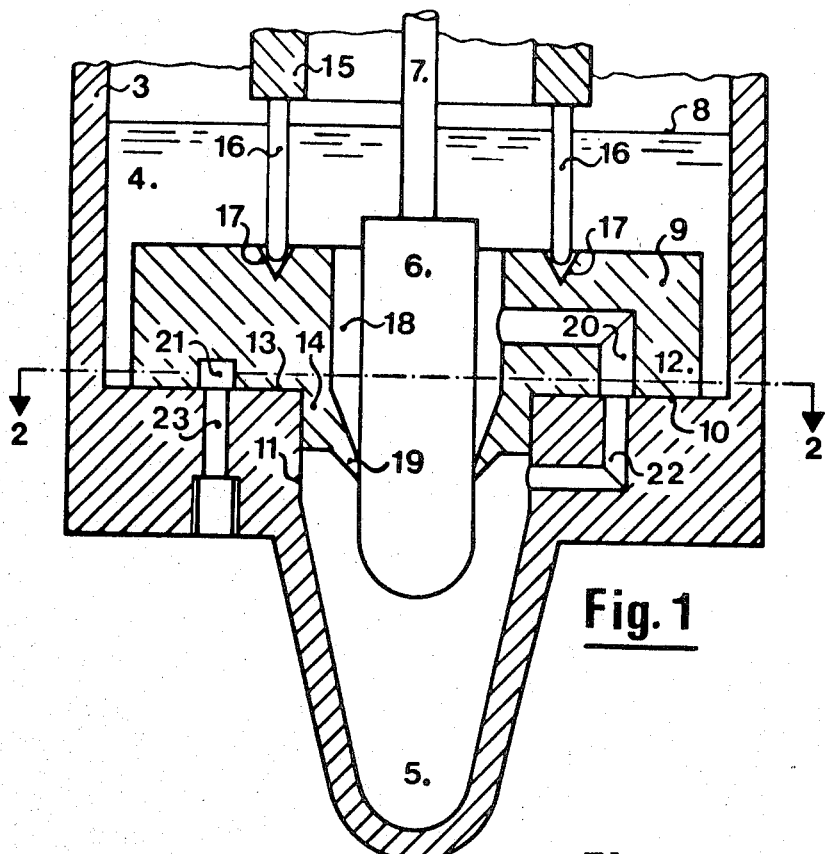

In the patented prior art, various types of metering valves have been disclosed for dispensing a measured quantity of fluid from a fluid storage chamber. One difficulty normally experienced in these known devices is the problem of effecting a sufficiently tight seal between the working components of the device to prevent leakage of fluid between the storage and metering chambers and the housing outlet. Another problem adversely affecting metering valve operation—especially where the fluid to be dispensed is a salt solution or the like—is the solid material that is deposited from the fluid upon the working components when the device is idle for a period of time, which deposits hinder proper operation of the working components and further contribute to the difficulty of maintaining a fluid-tight seal. Moreover, in the case of metering valves having reversing valve means and plunger means for initially drawing fluid from a storage chamber into a metering chamber and for subsequently dispensing a measured quantity of fluid from said metering chamber, consideration must be given also to the manner in which the components are supported within the housing so as to always assure the greatest accuracy of measurement. The present invention was developed to avoid the above and other drawbacks of the known metering valves.

Accordingly, a primary object of the present invention is to provide improved metering valve means including a housing containing fluid storage and metering chambers and an outlet, and rotary reversing valve means that are angularly displaceable between filling and dispensing positions in which said metering chamber is alternately connected with said storage chamber and with said outlet, respectively. In accordance with a characterizing feature of the invention, plunger means are mounted for reciprocation along an axis coincident with the axis of rotation of said reversing valve means, said plunger means being operable in one direction to draw fluid from said storage chamber into said metering chamber, and in the opposite direction to expel fluid from said metering chamber via said outlet.

In accordance with a more specific object of the invention, the metering chamber is defined by a recess contained in the planar end wall of the fluid storage chamber, said reversing valve means comprising a valve body having a planar surface seated upon said end wall surface to isolate said metering chamber from said storage chamber. According to an important feature of the invention, the orifice of the metering chamber is cylindrical, said valve body having a tubular extension that is arranged concentrically about the plunger means and is journalled within said cylindrical orifice, thereby supporting the valve body and plunger means within the housing in a positive manner. Annular seal means are arranged concentrically about the plunger means for sealing the space between said plunger means and the wall of the through bore.

Figure 2:
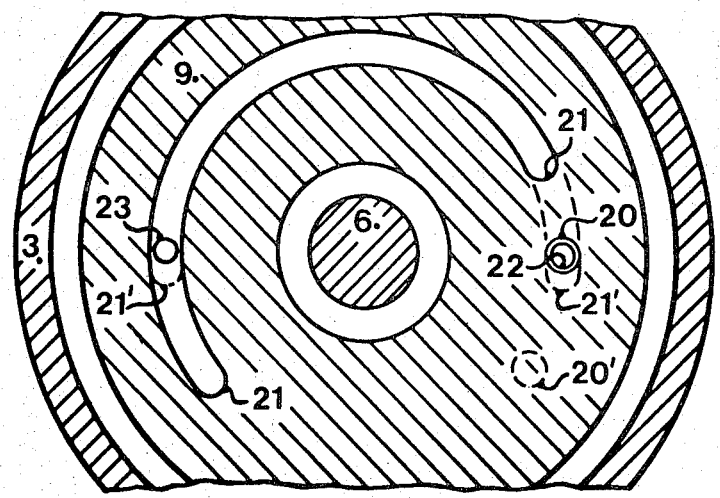

Other objects and advantages of the invention will become apparent from a study of the following specification when viewed in the light of the accompanying drawing, in which:

FIG. 1 is a detailed axial sectional view of the fluid metering pump means of the present invention, the valve body being in its filling position; and FIG. 2 is a sectional view taken along line 2—2 of FIG. 1.

Referring now to the drawing, the housing 3 includes a fluid storage chamber 4 that defines a planar end wall 10 which contains both an outlet passage 23 and a recess that defines the metering chamber 5. Valve body 9 is seated with its lower planar 13 in surface-to-surface contact with end wall 10, said valve body being arranged to isolate both outlet passage 23 and metering chamber 5 from the fluid storage chamber 4. Extending downwardly from the lower surface 13 of the valve body 9 is a tubular extension 14 that is journalled in the cylindrical orifice 11 of the metering chamber 5. The valve body 9 contains a central through bore 18 that is coincident with the longitudinal axis of cylindrical orifice 11. Slidably mounted within the through bore 18 is a plunger 6 the upper end of which is connected with plunger operating means 7. The diameter of through bore 18 is slightly greater than that of said plunger, thereby defining an annular space between the outer surface of the plunger and the inner surface of the bore. At its lower end adjacent the metering chamber 5, the tubular extension is provided with annular lip seal means 19 that extend radially inwardly into sealed engagement with the plunger 6.

In accordance with the present invention, the valve body 9 is angularly displaceable between fitting and dispensing positions relative to the housing by valve operating means 15 arranged concentrically about the plunger operating means 7 above the fluid level 8, said operating means being coupled with the valve body by means of entrainment pins 16 that extend axially downwardly into corresponding recesses 17 contained in the upper surface of the valve body. In the alternative, the operating member 15 may be coupled with the valve body by means of a Cardan joint and a spring disc to effect a bearing pressure that is uniformly distributed along the sealing surface 13 of the valve body.

The valve body and the housing contain first passage means (20, 22) that connect the metering chamber 5 with the storage chamber 4 when the valve body is in the filling position (FIG. 1), and second passage means (21, 22) that connect the metering valve with the outlet 23 when the valve body is in the discharge position (illustrated in phantom in FIG. 2). The first passage means includes a first conduit portion 20 that communicates at one end with the annular space 18, said first conduit portion having an orifice at its other end in the planar surface 13 of valve body 9, and a second conduit portion 22 contained in the housing, said second conduit portion being in communication at one end with the metering chamber 5 and having at its other end an orifice contained in the planar end wall surface 10. The second passage means includes a generally semicircular groove 21 contained in the planar valve body surface 13, said groove being operable, when the valve body is in the discharge position illustrated in phantom in FIG. 2, to connect the orifice of second conduit portion 22 with the outlet 23.

In operation, assume that the valve body 9 is initially in the illustrated filling position and that plunger 6 is progressively displaced upwardly to draw a desired quantity of fluid from storage chamber 4 into metering chamber 5. Upon rotation of operating member 15 to angularly displace valve body 9 to the dispensing position, communication between the conduit portions 22 and 23 is interrupted, and the orifice of first conduit portion 22 is brought into communication with outlet 23 via the semicircular groove 21. Operator 7 and plunger 6 are then displaced downwardly to expel the desired quantity of fluid from the metering chamber 5 via second conduit portion 22, groove 21 and outlet 23. The valve body 9 is then rotated to its original filling position, wherein the outlet 23 is again isolated from the storage and metering chambers.

Preferably, the plunger 6 is formed of glass, and the valve body 9 is formed of a synthetic plastic material, such as polytetrafluorethylene. The housing is formed of glass or a suitable synthetic plastic material, such as fluorethylene-propylene, whereby the apparatus may be used in metering chemically active fluids. In accordance with an important functional feature of the invention, the apparatus is especially suitable for use in connection with fluids containing salts or the like that have a tendency to separate out. For example, in the event that such salts were to be deposited upon the plunger 6, they would be stripped off the plunger by the lip means 19 during the axial displacement of the plunger means during pumping, so that the plunger means always remains clean. Furthermore, a self-cleaning effect is achieved by the rubbing action between the planar surfaces 10 and 13 during rotation of the valve body between the filling and dispensing positions. Furthermore, the metering of easily vaporized fluids is also permitted by the apparatus of the present invention, since the parts of the metering pump which are important for the metering are located below the surface 8 of the fluid, and are always exposed to a certain fluid pressure. The fluid metering pump, as explained, is particularly well-suited for exact meterings in the millilitre-to-microlitre range.

While in accordance with the provisions of the patent statutes the preferred form and embodiment of the invention has been illustrated and described, it will be apparent to those skilled in the art that various changes and modifications may be made without deviating from the inventive concepts.

What is claimed is:

1. A fluid metering pump, comprising:
   (a) a housing (3) containing a fluid storage chamber (4) having an end wall (10) that contains a recess defining a metering chamber (5), said end wall also containing an outlet opening (23) remote from said recess;
   (b) reversing valve means for connecting said metering chamber alternately with said storage chamber and with said outlet, respectively, said reversing valve means including a valve body (9) seated on said end wall to isolate said storage chamber from said metering chamber and from said outlet, said valve body being arranged for rotation about an axis colinear with said metering chamber and normal to said end wall for angular displacement between filling and dispensing positions relative to said housing, said valve body and said housing containing first passage means (20, 22) that connect said metering chamber with said storage chamber when said valve body is in the filling position, and second passage means (21, 22) that connect said metering chamber with said outlet when said valve body is in the discharge position; and
   (c) plunger means (6) mounted for axial displacement within a central through bore contained in and coincident with the axis of rotation of said valve body, said plunger means being operable in one direction when said valve body is in the filling position for drawing fluid from said storage chamber into said metering chamber, said plunger means being operable in the opposite direction when said valve body is in the discharge position for pumping fluid from said metering chamber outwardly of the housing via said outlet opening.

2. Apparatus as defined in claim 1, and further including annular seal means (19) arranged concentrically about said plunger means for sealing the space between said plunger means and said through bore.

3. Apparatus as defined in claim 2 wherein the orifice (11) of said metering chamber is cylindrical; wherein said through bore and said plunger means are colinear with the central longitudinal axis of said orifice; and further wherein said valve body includes a tubular extension (14) concentrically arranged about said plunger means, said tubular extension being journalled within said cylindrical orifice.

4. Apparatus as defined in claim 3, wherein the diameter of said through bore is greater than that of said plunger means; and further wherein said seal means comprises radially inwardly directed lip means carried by the end of said valve body tubular extension adjacent said metering chamber, thereby to define adjacent said storage chamber an annular space (18) arranged concentrically between said plunger means and the wall of said through bore.

5. Apparatus as defined in claim 4, wherein said first passage means includes a first conduit portion (22) contained in said housing, said first conduit portion communicating at one end with said metering chamber and terminating at the other end in an orifice contained in said end wall, said first passage means including also a second conduit portion (20) contained in said valve body, said second conduit portion having at one end an orifice contained in the face of said valve body adjacent said end wall for communication with the corresponding orifice of said first conduit portion, said second conduit portion being in communication at its other end with the annular space (18) around said plunger.

6. Apparatus as defined in claim 5, wherein said second conduit means includes a groove (21) contained in the face of said valve body opposite said end wall, said groove having a generally semicircular configuration and being in communication, when said valve body is in the discharge position, at opposite ends with said outlet opening and the adjacent orifice of said first conduit portion.

7. Apparatus as defined in claim 4, wherein said tubular extension and said sealing lip means are integral with said valve body.

8. Apparatus as defined in claim 7, wherein said plunger means includes an operating rod (7) that extends longitudinally within said storage chamber.

9. Apparatus as defined in claim 8, and further including operating means for angularly displacing said valve body between said filling and discharge positions, said operating means including a tubular member (15) arranged concentrically about and spaced from said plunger operating rod, said longitudinally extending spaced pin means (16) connecting said tubular member with said valve body.

References Cited

UNITED STATES PATENTS 3,096,914   7/1963   Kerr _____ 222—380 X

SAMUEL F. COLEMAN, Primary Examiner

L. MARTIN, Assistant Examiner

U.S. Cl. X.R.

222—385; 417—519